United States Patent
Milton

(10) Patent No.: US 7,606,328 B1
(45) Date of Patent: Oct. 20, 2009

(54) COMMON SIGNAL GENERATION FOR AN RF RECEIVER

(75) Inventor: Kevin L. Milton, Solon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 705 days.

(21) Appl. No.: 10/871,393

(22) Filed: Jun. 18, 2004

(51) Int. Cl.
*H04L 27/00* (2006.01)

(52) U.S. Cl. .................................. 375/316; 375/331

(58) Field of Classification Search ............... 375/137, 375/142, 147, 316, 326, 329, 331
See application file for complete search history.

(56) References Cited

U.S. PATENT DOCUMENTS

| | | | |
|---|---|---|---|
| 5,301,364 A * | 4/1994 | Arens et al. ................... 455/69 |
| 5,495,203 A * | 2/1996 | Harp et al. ................... 329/306 |
| 5,640,698 A * | 6/1997 | Shen et al. ................... 455/323 |
| 5,663,734 A | 9/1997 | Krasner ....................... 342/357 |
| 5,689,271 A * | 11/1997 | Lennen ................... 342/357.12 |
| 5,694,417 A * | 12/1997 | Andren et al. .............. 375/150 |
| 5,815,101 A * | 9/1998 | Fonte ............................ 341/123 |
| 5,923,287 A * | 7/1999 | Lennen .................. 342/357.06 |
| 5,949,372 A * | 9/1999 | Lennen .................. 342/357.02 |
| 5,974,094 A * | 10/1999 | Fines et al. .................. 375/335 |
| 6,252,464 B1 * | 6/2001 | Richards et al. ................ 331/4 |
| 6,356,602 B1 * | 3/2002 | Rodal et al. .................. 375/344 |
| 6,369,753 B1 | 4/2002 | Schucker et al. ............ 342/357 |
| 6,542,821 B2 | 4/2003 | Krasner ....................... 701/213 |
| 6,847,812 B2 * | 1/2005 | Doetsch et al. ............. 455/316 |
| 6,977,977 B1 * | 12/2005 | Dubrovin et al. ........... 375/346 |
| 2004/0010368 A1 * | 1/2004 | Scott .......................... 701/213 |
| 2005/0242982 A1 * | 11/2005 | Hughes ....................... 341/161 |
| 2006/0262872 A1 * | 11/2006 | Green et al. ................. 375/260 |
| 2008/0025378 A1 * | 1/2008 | Mahany et al. .............. 375/150 |

* cited by examiner

*Primary Examiner*—Emmanuel Bayard
(74) *Attorney, Agent, or Firm*—Daniel M. Barbieri

(57) ABSTRACT

A common signal generating sub-system (CSGS) for a radio frequency (RF) receiver. The CSGS includes a down converter section and a digitizer section. The down converter section receives intermediate frequency (IF) signals and injection frequency signals from an RF/IF processing section of an RF receiver and translates the IF signals to analog intermediate frequency (IF) signals preserving the spectra thereof. The analog IF signals comprise analog in-phase IF signals and analog quadrature IF signals. The digitizer section utilizes a locally generated sampling rate signal (LGSRS) and converts the analog in-phase IF signals and the analog quadrature IF signals to a common digital in-phase IF signal and a common digital quadrature IF signal. The common digital IF signals can be subsequently processed by a digital processing section of the RF receiver. Implemented in a GPS system, by selecting the proper injection signals and A/D sampler rate, the L1, L2 and L5 signals can be converted to a single digital IF frequency for use with a common digital processing section.

17 Claims, 3 Drawing Sheets

COMMON SIGNAL GENERATION FOR AN RF RECEIVER

BACKGROUND OF THE INVENTION

1. Field of the Invention

The present invention relates to radio frequency (RF) receivers and more particularly to receivers capable of determining position information of satellites. It is particularly adaptable for use with global positioning satellite (GPS) systems. It utilizes common signal processing to minimize hardware circuitry.

2. Description of the Related Art

The Global Positioning System (GPS) consists of a constellation of satellites with synchronized atomic clocks that transmit radio signals. Time, as maintained by each satellite, is embedded in the transmitted radio signal of each satellite. The difference between the time embedded in a satellite's radio signal and a time measured at the point of reception of the radio signal by a clock synchronized to the satellite clocks is a measure of the range of the satellite from the point of reception.

Each satellite transmits, in addition to its clock time, its position in an earth-fixed coordinate system and its own clock error. A user, by measuring the pseudoranges to four satellites and correcting the pseudoranges for the satellite clock errors, can first of all determine his actual range to each satellite and his own clock error. The user can then determine his own position in the earth-fixed coordinate system, knowing his range to each of the four satellites and the position of each satellite in the earth-fixed coordinate system.

The current GPS system utilizes two signal frequencies for transmission. These frequencies are referred to as Link 1 (L1) and Link 2 (L2). The L1 signal frequency is 154fo (fo=10.23 MHz) or 1575.42 MHz and the L2 signal frequency is 120fo or 1227.6 MHz. These frequencies are modulated with pseudorandom sequences which are used to measure the time difference discussed above. Currently, there are two rates used for these sequences (10.23 MHz and 1.023 MHz). The higher rate is referred to as P/Y and the lower rate is referred to as C/A.

Several enhancements are planned to GPS. A third frequency (referred to as L5) is planned at 115fo or 1176.45 MHz with a PRN rate of 10.23 MHz. In addition, a new PRN sequence is also planned at 5.115 MHz for the existing L1 and L2 frequencies. The addition of these new signals will require additional processing in a GPS receiver. As will be disclosed below, the present invention proposes a method to process all the above GPS signals with common digital processing.

U.S. Pat. No. 6,369,753, issued to Schuker et. al., entitled "Host-Independent Monolithic Integrated Circuit for RF Downconversion", discloses a global position system (GPS) receiver for a host product which is controlled by a microcontroller that also controls other functions in the host product. The GPS receiver includes an RF downconverter and a digital signal processor. The digital signal processor includes a correlator and an interface for asynchronously interfacing the correlator with the product's microcontroller. A monolithic integrated circuit includes RF downconverter circuitry, the correlator, and the interface for the GPS receiver The Schuker et al system is primarily concerned with interfacing a GPS receiver to another system or subsystem and it is not concerned with military GPS signals or the new civil GPS signal (L5) or how these signals could be processed with common signal processing.

U.S. Pat. No. 5,663,734, issued to N. F. Krasner, entitled "GPS Receiver and Method for Processing GPS Signals", discloses a GPS receiver in one embodiment that includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and, a digital signal processor (DSP) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a base station in one embodiment of the invention.

The Krasner patent is primarily concerned with minimizing receiver power by powering down the RF section while digitally processing the signals and is not concerned with military GPS signals or the new civil GPS signal (L5) or how these signals could be processed with common signal processing.

Using a traditional approach, the GPS receiver would implement dedicated circuitry to tune the new signals. As will be disclosed below the present invention involves translating the existing and new GPS signal signals to a single new frequency using a combination of frequency mixing and critical sampling rates. This single intermediate frequency (IF) allows common digital circuitry to be used for all of the GPS signal processing.

SUMMARY OF THE INVENTION

In a broad aspect, the present invention is a common signal generating sub-system (CSGS) for a radio frequency (RF) receiver. The CSGS includes a down converter section and a digitizer section. The down converter section receives intermediate frequency (IF) signals and injection frequency signals from an RF/IF processing section of an RF receiver and translates the IF signals to analog intermediate frequency (IF) signals preserving the spectra thereof. The analog IF signals comprise analog in-phase IF signals and analog quadrature IF signals. The digitizer section utilizes a locally generated sampling rate signal (LGSRS) and converts the analog in-phase IF signals and the analog quadrature IF signals to a common digital in-phase IF signal and a common digital quadrature IF signal. The common digital IF signals can be subsequently processed by a digital processing section of the RF receiver.

The present invention is particularly adaptable for use with a GPS receiver. The downconverter and digitizer sections of the common signal generating sub-system (CSGS) translate the input frequency to a desired frequency and perform the conversion of the analog signal to a digital signal. By selecting the proper injection signals and A/D sampler rate, the L1, L2 and L5 signals can be converted to a single digital IF frequency for use with a common digital processing section. This allows a single processing section to be used by multiplexing among the input signals. This also simplifies the receiver design since the same digital processing section can be duplicated as many times as necessary for the desired number of parallel signal channels.

DETAILED DESCRIPTION OF THE INVENTION

Figure 1:
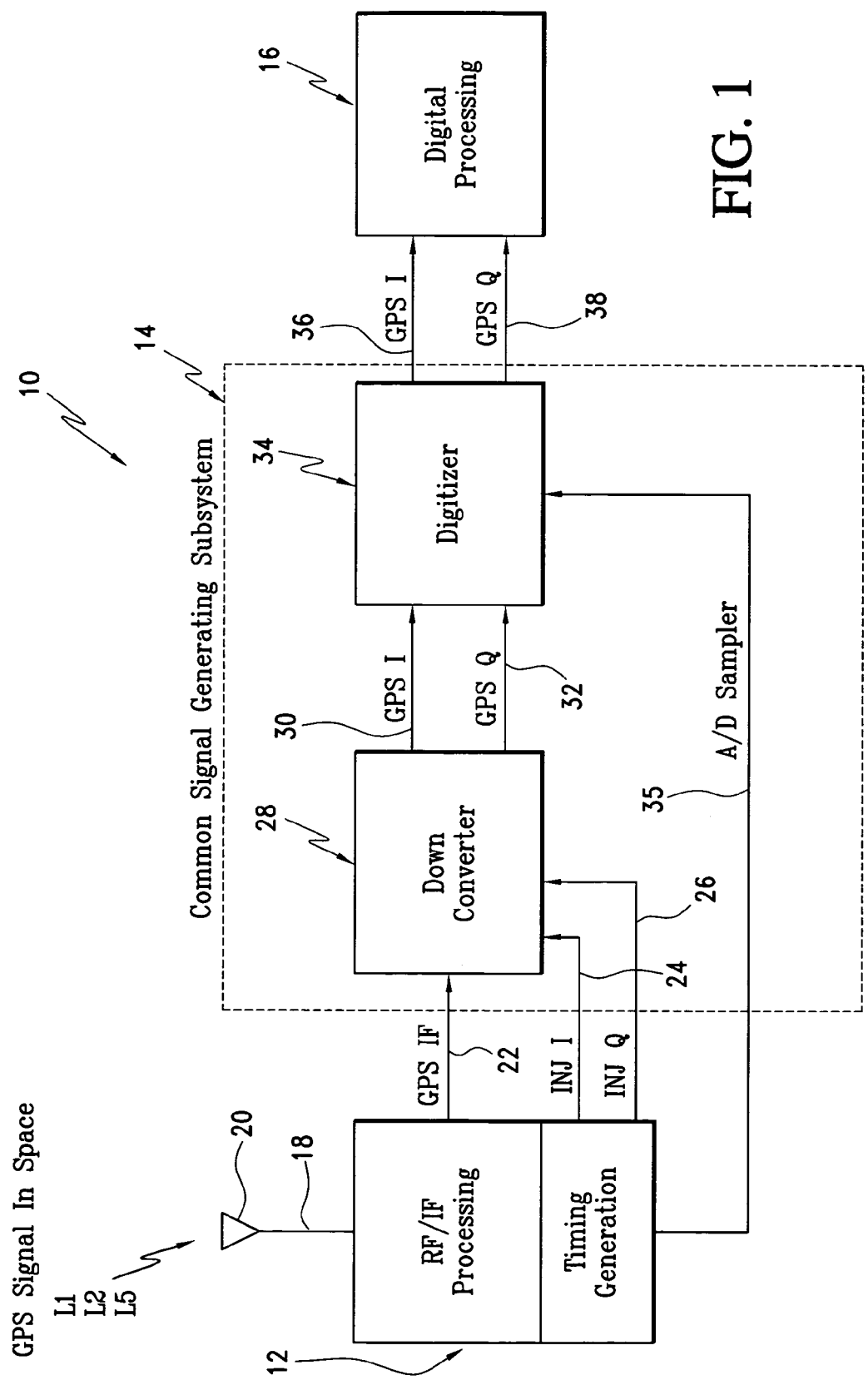
FIG. 1 is a schematic diagram of a receiver of the present invention.

Referring now to the drawings and the characters of reference marked thereon, FIG. 1 is a schematic illustration of a GPS receiver of the present invention, designated generally as 10. The GPS receiver 10 includes an RF/IF processing section 12, a common signal generating subsystem 14 and a digital processing section 16.

The RF/IF processing section 12 accepts the GPS signals 18 from the antenna 20 and performs any necessary filtering and amplification. Additionally, the RF/IF processing section 12 provides the GPS intermediate frequency (IF) signals 22 and the injection signals 24, 26 used to convert the GPS RF or IF signals to any other subsequent intermediate frequency which may be required. Typically, both In-Phase (I) and Quadrature (Q) injection signals are used in the down conversion to synthesize the intermediate frequency.

The downconverter section 28 of the common signal generating subsystem 14 develops the I and Q GPS signals 30, 32 by mixing the incoming signals 22 from the RF/IF processing section with the injection signals 24, 26. This process translates the frequency of the received signals while preserving the spectra thereof.

The digitizer section 34 performs the analog to digital (A/D) conversion on the incoming GPS I and Q signals 30, 32. This section 34 also accepts a locally generated sampling rate signal (LGSRS) 35 which is used as the sampling frequency for the A/D conversion. The sampler also provides frequency translation by aliasing the input signal.

The digital processing section 16 performs the final signal processing on the digitized GPS signals 36, 38. Code and carrier removal as well as signal integration and interfacing to the system software is typically performed by this section.

Figure 2:
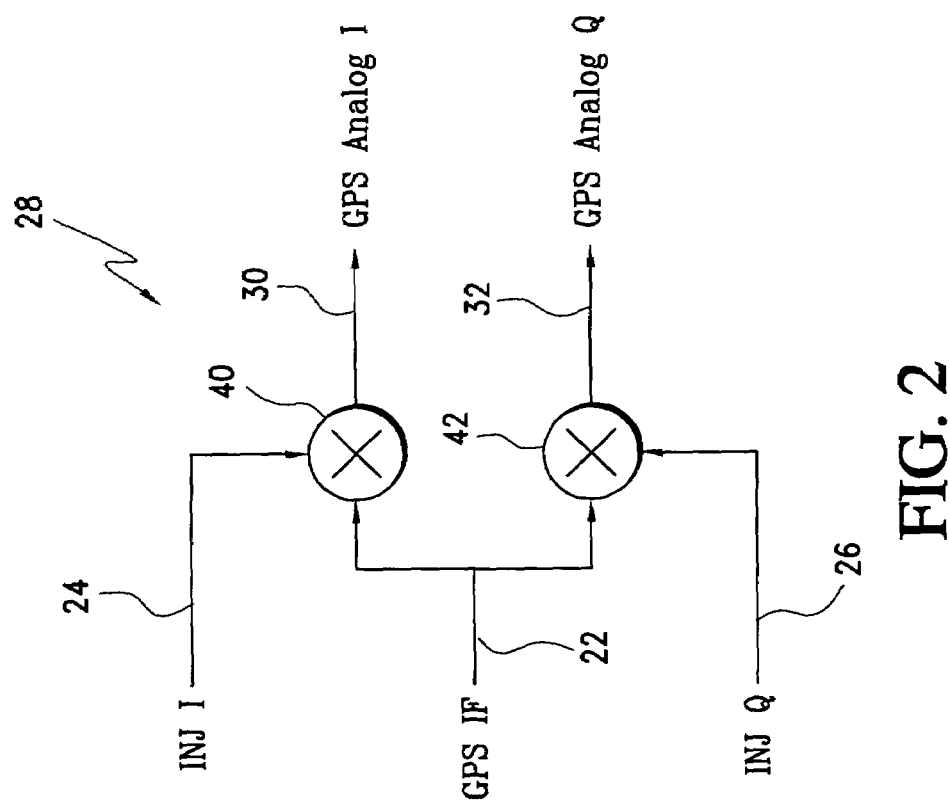
FIG. 2 is a schematic diagram of a downconverter section of the present invention.

Referring now to FIG. 2 a downconverter section 28 is illustrated. It typically includes a first mixer 40 and a second mixer 42. The first mixer 40 receives the GPS IF signals 22 and an in-phase (I) injection frequency signal 24 of the injection frequency signals. The first mixer 40 provides the analog in-phase IF signals 30. The second mixer 42 receives the GPS IF signals 22 and a quadrature (Q) injection frequency signal 26 of the injection frequency signals. The second mixer 42 provides the analog quadrature IF signals 32.

Figure 3:
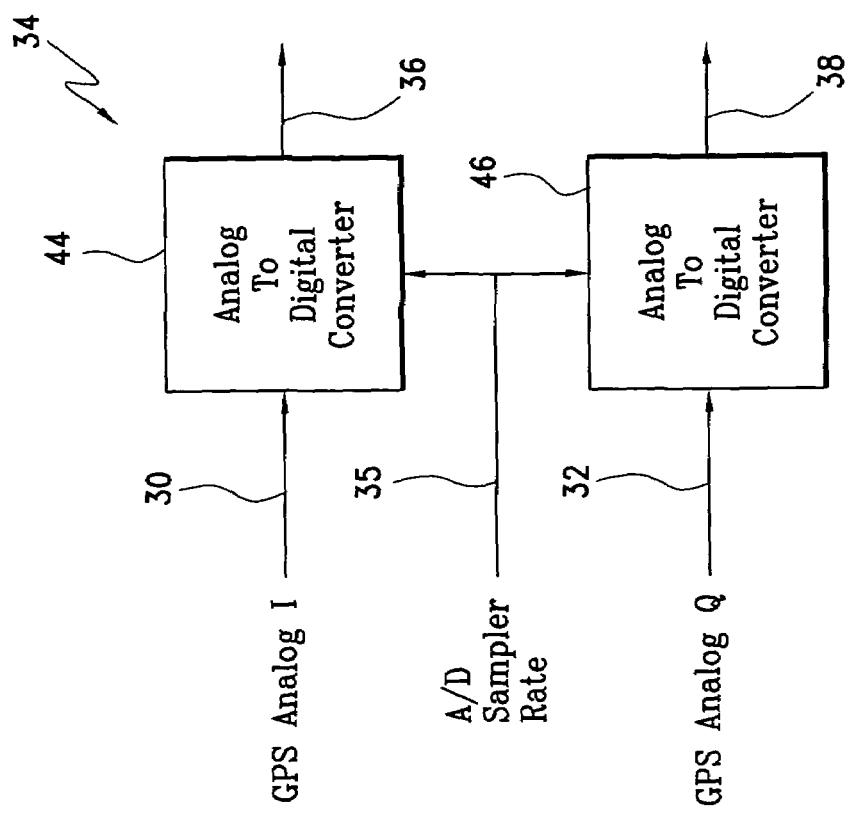
FIG. 3 is a schematic diagram of a digitizer section of the present invention.

Referring now to FIG. 3, a schematic illustration of the digitizer 34 is illustrated. The digitizer 34 includes a first analog to digital converter 44 for receiving the analog in-phase IF signals 30 and the LGSRS 35 and provides the common digital in-phase IF signal 36. A second analog to digital converter 46 receives the analog quadrature IF signals 32 and the LGSRS 35 and provides the common digital quadrature IF signal 38.

Figure 4:
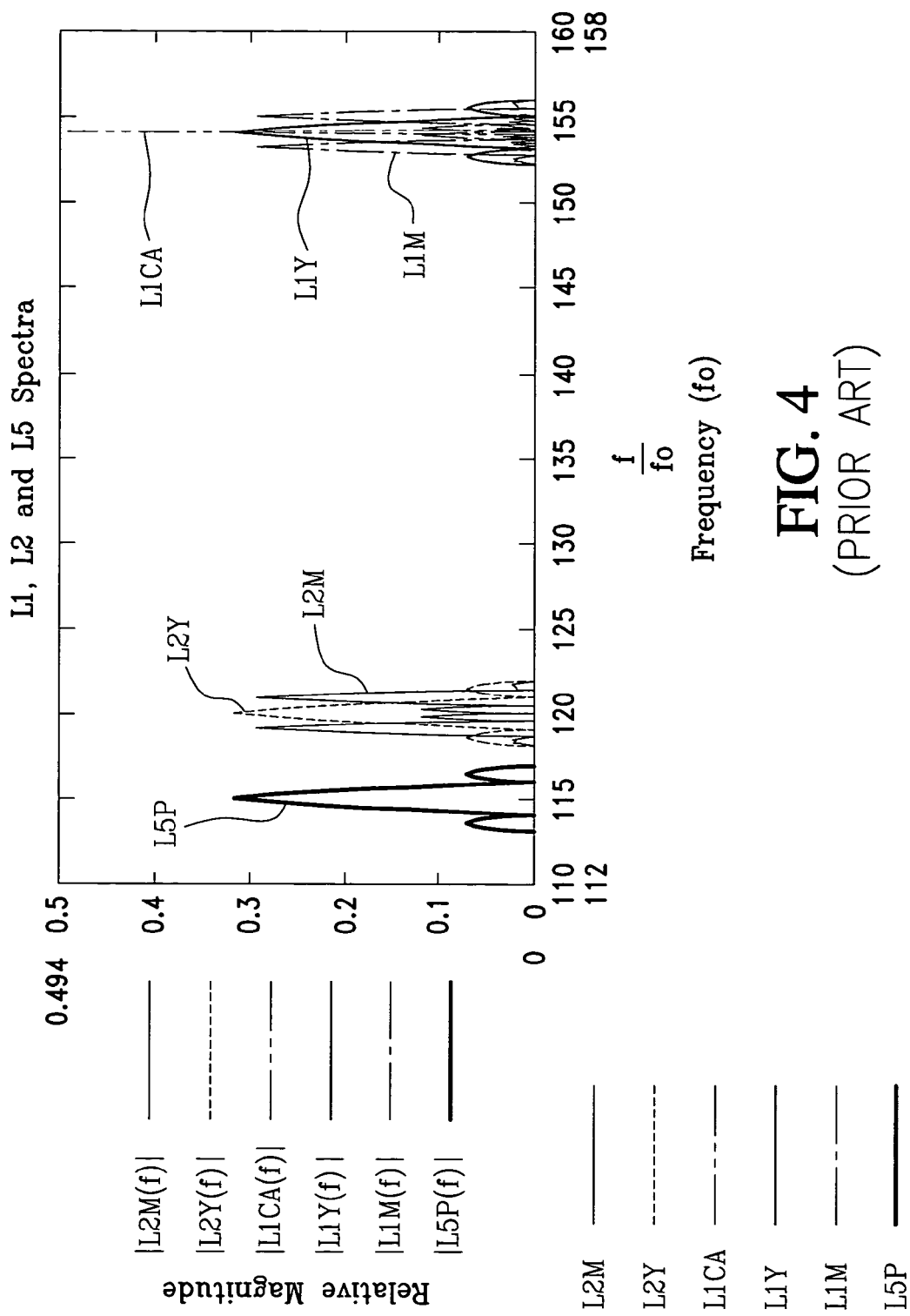
FIG. 4 (Prior Art) is a graph illustrating the GPS spectra for the L1, L2 and L5 GPS signals.

Referring now to FIG. 4 (Prior Art), the spectra for the L1, L2 and L5 GPS signals are shown. This figure shows the various CDMA modulations present on each signal. For L1 (at 154fo), this includes the CA, M and Y code modulation. For L2 (at 120fo), this includes the Y and M code modulation. For L5 (at 115fo), this includes the P code modulation. As the figure shows, these signals are separated in frequency and have different bandwidths.

As an example of how the downconverter and digitizer sections can be used, assume that a digital IF frequency of fo/8 is desired. (fo is 10.23 MHz). Consider the L1, L2 and L5 GPS signals. The transmitted frequencies of these signals are 154fo, 120fo and 115fo respectively. Mixing these signals with a signal at 137fo in the RF/IF processing section results in IF frequencies of 17fo for L1 and L2 and 22fo for L5. The use of an injection signal of 137fo/8 results in a second IF frequency of fo/8 (INJ I and INJ Q in the figure above) for L1 and L2 and 39fo/8 for L5. In this case, the desired digital IF frequency of fo/8 has been synthesized for L1 and L2.

The use of an A/D sampler rate of 5fo translates the L5 signal at 39fo/8 to fo/8. Since L1 and L2 are already at fo/8 this frequency is also at the output of the digitizer section. The output of the digitizer consists of L1, L2 and L5 at the desired digitized frequency of fo/8. This enables a common digital processing section to be used to process the L1, L2 and L5 signals. This also enables a single digital processing section to be multiplexed among the three GPS signals to reduce circuitry, if desired. Note that an AND sampler rate of 39fo also translates the L5 signal to the desired fo/8 intermediate frequency while preserving the L1 and L2 spectra. Since this is a higher sampling rate than 5fo, there will be less interference from the aliased signals. This may be desirable for a high performance solution, while the 5fo rate may be adequate for lower performance (and lower power) solutions.

The present invention enables M-code processing because 5fo (or 39fo) sampling allows adequate "room" between the higher bandwidth signals (i.e. the M-code and L5 spectra).

The present invention is not limited to the processing of GPS signals. It can be readily implemented for other RF receiver systems, particularly digital receivers for navigation systems such as GPS and communication receivers such as the Joint Tactical Radio System (JTRS). The tuning of various signals by the combination of down converter sections and digitizer sections is applicable to any RF signal by utilizing various combinations of downconverter values and A/D sampling rates. Implemented with a GPS system this invention processes the various GPS signals into a common IF while preserving the bandwidth of the signals.

Other embodiments and configurations may be devised without departing from the spirit of the invention and the scope of the appended claims.

The invention claimed is:

1. A common signal generating sub-system (CSGS) for a radio frequency (RF) receiver, said CSGS comprising:
    a down converter section for receiving intermediate frequency (IF) signals and injection frequency signals from an RF/IF processing section of an RF receiver and for translating said IF signals to analog intermediate frequency (IF) signals preserving the spectra thereof, said analog IF signals comprising analog in-phase IF signals and analog quadrature IF signals; and,
    a digitizer section for utilizing a locally generated sampling rate signal (LGSRS) and converting said analog in-phase IF signals and said analog quadrature IF signals to a common digital in-phase IF signal and a common digital quadrature IF signal, wherein said common digital IF signals can be subsequently processed by a digital processing section of the RF receiver, said LGSRS providing additional frequency translation by aliasing said analog in-phase IF signals and analog quadrature IF signals using an A/D sampler rate, wherein said digitizer section, comprises:

a first analog to digital converter for receiving said analog in-phase IF signals and said LGSRS and providing said digital in-phase IF signal; and, a second analog to digital converter for receiving said analog quadrature IF signals and said LGSRS and providing said digital quadrature IF signal, wherein the combination of the down converter section and the digitizer section perform frequency translation in conjunction with each other.

2. The common signal generating sub-system (CSGS) of claim 1 wherein said RF receiver comprises a satellite receiver and said IF signals comprise satellite IF signals.

3. The common signal generating sub-system (CSGS) of claim 1 wherein said RF receiver comprises a GPS receiver and said IF signals comprise GPS IF signals.

4. The common signal generating sub-system (CSGS) of claim 3 wherein said downconverter section comprises:

a first mixer for receiving said GPS IF signals and an in-phase (I) injection frequency signal of said injection frequency signals and providing said analog in-phase IF signals; and, a second mixer for receiving said GPS IF signals and a quadrature (Q) injection frequency signal of said injection frequencies and providing said analog quadrature IF signals.

5. The common signal generating sub-system (CSGS) of claim 3 wherein said injection frequency signals are 137 Fo/8, where Fo=10.23 MHz; and, said LGSRS is 5Fo.

6. The common signal generating sub-system (CSGS) of claim 3 wherein said injection frequency signals are 137 Fo/8, where Fo=10.23 MHz; and, said LGSRS is 39Fo.

7. A radio frequency (RF) receiver, comprising:

an RF/IF processing section for receiving source signals from an RF source, for performing desired filtering and for providing intermediate frequency (IF) signals and injection frequency signals;

a common signal generating sub-system (CSGS) operatively associated with said RF/IF processing section, comprising:

a down converter section for receiving said intermediate frequency (IF) signals and said injection frequency signals and for translating said IF signals to analog intermediate frequency (IF) signals preserving the spectra thereof, said analog IF signals comprising analog in-phase IF signals and analog quadrature IF signals; and a digitizer section for utilizing a locally generated sampling rate signal (LGSRS) and converting said analog in-phase IF signals and said analog quadrature IF signals to a common digital in-phase IF signal and a common digital quadrature IF signal; and, a digital processing section for receiving the common digital in-phase IF signal and common digital quadrature IF signal and performing the remaining digital processing for acquisition and tracking of the source signals, said LGSRS providing additional frequency translation by aliasing said analog in-phase IF signals and analog quadrature IF signals using an A/D sampler rate, wherein said digitizer section, comprises:

a first analog to digital converter for receiving said analog in-phase IF signals and said LGSRS and providing said digital in-phase IF signal; and, a second analog to digital converter for receiving said analog quadrature IF signals and said LGSRS and providing said digital quadrature IF signal, wherein the combination of the down converter section and the digitizer section perform frequency translation in conjunction with each other.

8. The RF receiver of claim 7 wherein said receiver comprises a satellite receiver and said IF signals comprise satellite IF signals.

9. The RF receiver of claim 7 wherein said receiver comprises a GPS receiver and said IF signals comprise GPS IF signals.

10. The RF receiver of claim 9, wherein said downconverter section comprises:

a first mixer for receiving said GPS IF signals and an in-phase (I) injection frequency signal of said injection frequency signals and providing said analog in-phase IF signals; and, a second mixer for receiving said GPS IF signals and a quadrature (Q) injection frequency signal of said injection frequencies and providing said analog quadrature IF signals.

11. The RF receiver of claim 9, wherein said injection frequency signals are 137 Fo/8, where Fo=10.23 MHz; and, said LGSRS is 5Fo.

12. The RF receiver of claim 9, wherein said injection frequency signals are 137 Fo/8, where Fo=10.23 MHz; and, said LGSRS is 39Fo.

13. A method for processing radio frequency (RF) signals from an RF source, comprising the steps of:

receiving source signals from an RF source, performing desired filtering and providing intermediate frequency (IF) signals and injection frequency signals;

translating said IF signals to analog intermediate frequency (IF) signals preserving the spectra thereof, said analog IF signals comprising analog in-phase IF signals and analog quadrature IF signals;

utilizing a locally generated sampling rate signal (LGSRS) and converting said analog in-phase IF signals and said analog quadrature IF signals to a common digital in-phase IF signal and a common digital quadrature IF signal; and, utilizing said common digital in-phase IF signal and common digital quadrature IF signal for performing the remaining digital processing for acquisition and tracking of the source signals, said LGSRS providing additional frequency translation by aliasing said analog in-phase IF signals and analog quadrature IF signals using an A/D sampler rate, wherein, said step of utilizing a locally generated sampling rate signal (LGSRS) and converting said analog in-phase IF signals and said analog quadrature IF signals, comprises the steps of:

utilizing a first analog to digital converter for receiving said analog in-phase IF signals and said LGSRS and providing said digital in-phase IF signal; and, utilizing a second analog to digital converter for receiving said analog quadrature IF signals and said LGSRS and providing said digital quadrature IF signal, wherein the combination of the down converter section and the digitizer section perform frequency translation in conjunction with each other.

14. The method of claim 13 wherein said step of receiving source signals comprises receiving source signals from a satellite receiver and said step of providing IF signals comprises providing satellite IF signals.

15. The method of claim 13 wherein said step of receiving source signals comprises receiving source signals from a GPS receiver and said step of providing IF signals comprises providing GPS IF signals.

16. The method of claim 15 wherein said step of translating said IF signals to analog intermediate frequency (IF) signals comprises the steps of:

mixing said GPS IF signals and an in-phase (I) injection frequency signal of said injection frequency signals and providing said analog in-phase IF signals; and, mixing said GPS IF signals and a quadrature (Q) injection frequency signal of said injection frequencies and providing said analog quadrature IF signals.

17. The method of claim 15, wherein said injection frequency signals are 137 Fo/8, where Fo=10.23 MHz; and, said LGSRS is 5Fo.

* * * * *